(12) United States Patent
Clark et al.

(10) Patent No.: US 6,428,390 B1
(45) Date of Patent: Aug. 6, 2002

(54) METHOD AND APPARATUS FOR EDGE FINISHING GLASS SHEETS

(75) Inventors: Emmett F. Clark, Campbell; Guy P. Kenney, Painted Post; Bruce H. Raeder, Horseheads, all of NY (US); Peter M. Voit, Dublin; Gerard J. Voytek, Livermore, both of CA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/342,293

(22) Filed: Jun. 29, 1999

(51) Int. Cl.[7] .................................................. B24B 49/00
(52) U.S. Cl. .......................... 451/11; 451/44; 451/182; 451/184; 451/194
(58) Field of Search ............................... 451/11, 24, 41, 451/44, 182, 184, 194

(56) References Cited

U.S. PATENT DOCUMENTS

| | | | |
|---|---|---|---|
| 3,841,027 A | | 10/1974 | Bando |
| 3,889,801 A | * | 6/1975 | Boyer ........................ 198/184 |
| 3,991,538 A | * | 11/1976 | Finn et al. ..................... 53/21 |
| RE29,097 E | | 1/1977 | Bando |
| 4,079,551 A | | 3/1978 | Bando |
| 4,493,167 A | | 1/1985 | Bovone |
| 4,578,103 A | | 3/1986 | Fackelman |
| 4,660,327 A | | 4/1987 | Bando |
| 4,843,764 A | | 7/1989 | Bando |
| 5,028,182 A | | 7/1991 | Park |
| 5,197,937 A | * | 3/1993 | Dalrymple .................. 493/167 |
| 5,693,167 A | * | 12/1997 | Cahill et al. ................. 156/205 |
| 6,027,440 A | * | 2/2000 | Roth .......................... 493/436 |

OTHER PUBLICATIONS

Slocum, A. H., *Precision Machine Design*, Society of Manufacturing Engineers, Prentice Hall, New Jersey (1992), Chapter 9.

Bando's product brochure entitled "Automatic Glass Double Edging Machine." (published prior to Jun. 29, 1999).

Bando's product brochure entitled "Double Edging Machine," 1986.

Glass Machinery Engineering's product brochure entitled "MB, MB–PN Double Edgers." (published prior to Jun. 29, 1999).

* cited by examiner

*Primary Examiner*—M. Rachuba
(74) *Attorney, Agent, or Firm*—Maurice M. Klee

(57) ABSTRACT

A method and apparatus for holding a sheet of material during grinding of the edge of the sheet. The method and apparatus comprises supporting one surface of the sheet on a conveyor. A force is exerted on the sheet with a fluid pressure device, either using sub-atmospheric pressure or hydrostatic pressure.

11 Claims, 4 Drawing Sheets

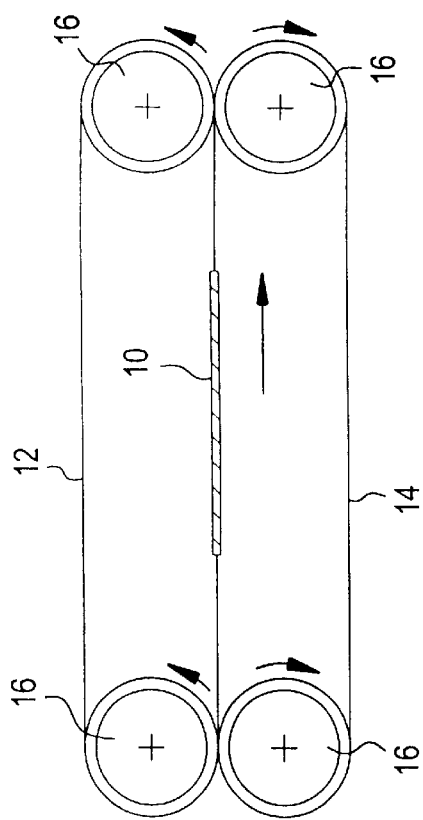
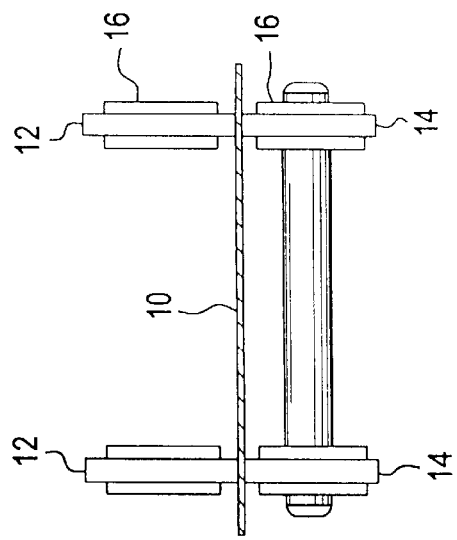
FIG. 1 PRIOR ART
FIG. 2 PRIOR ART

METHOD AND APPARATUS FOR EDGE FINISHING GLASS SHEETS

FIELD OF THE INVENTION

The present invention relates to a method and apparatus for edge finishing sheet materials. More particularly, the present invention relates to a method and apparatus for grinding and polishing the edges of sheet materials, such as glass sheets for use in flat panel displays which avoid damaging at least one surface of the sheet.

BACKGROUND OF THE INVENTION

Processing of sheet of materials that require a high quality surface finish, for example, glass sheets for flat panel displays, typically involves cutting the sheet into a desired shape and then grinding and/or polishing the edges of the cut sheet to remove any sharp corners. The grinding and polishing step is usually carried out on apparatus known as a double edger or double edging machine. Such double edging machines are known and available from Bando Kiko Co., Ltd., Mitsubishi Heavy Industries, Fukuyama Co., and Glass Machinery Engineering.

During the grinding and polishing of the edges of the glass sheets on a double edging machine, the sheet is typically sandwiched between neoprene or rubber belts in contact with both surfaces of the sheet. The belts contacting both surfaces of the sheet cooperate to hold the sheet in place while the edges of the glass are ground or polished by an abrasive grinding wheel. The belts also transport the sheet through a feeding section of the machine, a grinding or polishing section of the machine, and an end section of the machine.

A typical belt arrangement for a double edging machine is shown in FIGS. 1 and 2. A glass sheet 10, is sandwiched between upper belts 12 and a lower belts 14. As shown in FIG. 2, there is usually a pair of upper belts and lower belts that cooperate to hold the sheet 10. The belts 12 and 14 are driven and supported by pulleys 16. In operation, the pulleys rotate in the directions shown in FIG. 1, causing the belts to transport the sheet in the direction shown.

The above described method of gripping and conveying a sheet of glass through a grinding/polishing machine has several disadvantages. Particles generated during edge finishing can contaminate and scratch the glass sheet. Particles and chips caught between the upper belt 12 and the glass sheet 10 can severely damage the surface of the glass. Sometimes the damage can be the cause of a break source in subsequent processing and result in poor process yields due to rejected product.

In view of the disadvantages mentioned above, it would be desirable to provide a method and apparatus for conveying and holding a sheet of material such as glass while the edges of the sheet are being finished without damaging the quality surface of the sheet. The method and apparatus should be capable of applying a force sufficient to prevent the sheet from moving away from the edge finishing device during the finishing process.

SUMMARY OF INVENTION

Accordingly, the present invention generally provides a method and apparatus for grinding or polishing the edges of a sheet of material, particularly glass sheets, comprising grinding or polishing at least one edge of the sheet using grinding or polishing device. The method and apparatus of this invention further includes supporting one surface of the sheet on a conveyor and holding the sheet on the conveyor by exerting a force on the sheet with a fluid pressure device. The fluid pressure device preferably creates a force sufficient to maintain the glass on a conveyor having an average coefficient of friction of 0.45 during grinding or polishing of the glass. In one embodiment the force to hold the glass is at least about 10 pounds, and preferably at least 20 pounds, which can be measured using a spring pullout gauge.

In one embodiment of this invention, the fluid pressure device for creating the holding force is maintained adjacent one major surface of the sheet. According to one aspect of the invention, the fluid pressure device creates a sub-atmospheric pressure, for example, a vacuum pressure. In another aspect, the device comprises a plurality of elements attached to the conveyor for creating the sub-atmospheric pressure.

In another aspect of the invention, the fluid pressure device which applies the holding force creates a positive pressure. According to one aspect of the invention, the positive fluid pressure device comprises a hydrostatic bearing. In another embodiment, the positive fluid pressure device comprises an aerostatic bearing positioned adjacent the side of the sheet opposite the conveyor.

Advantageously, the present invention provides a method and apparatus for holding a flat article, such as a sheet of glass, while the edges of the article are being finished, without marking or impairing the surface of the article. Additional features and advantages of the invention will be set forth in the description which follows. It is to be understood that both the foregoing general description and the following detailed description are exemplary and explanatory and are intended to provide further explanation of the invention as claimed.

In the accompanying drawings, like reference characters denote similar elements throughout the several views. It is to be understood that various elements of the drawings are not intended to be drawn to scale, but instead are sometimes purposely distorted for the purposes of illustrating the invention.

BRIEF DESCRIPTION OF THE DRAWINGS

FIG. 1 illustrates a side view of a prior art edge finishing apparatus;

FIG. 2 illustrates an end view of a prior art edge finishing apparatus;

DETAILED DESCRIPTION

The present invention generally provides a method and apparatus for grinding and polishing the edges of flat articles such as a glass sheet. According to the present invention, the article is held in place on the grinding and polishing machine without impairing or marking at least one surface of the sheet. The apparatus and method of the present invention can be used in the art of edge finishing glass sheets, particularly glass sheets used in liquid crystal displays (LCDs). As discussed above, conventional edge finishing machines, such as double-edge grinders, utilize a set of belts which contacts both surfaces of the glass sheet. The set of belts cooperates to hold the glass while it is being edge finished and to convey the glass sheet past the finishing device, which is typically an abrasive wheel. Contacting both sides of the glass sheet with a set of belts, however, can damage the glass surface.

Accordingly, the present invention generally provides a method and apparatus wherein the glass sheet is held on a conveyor while at least one edge of the sheet is ground or polished. Holding is accomplished by exerting a force on at least one major surface of the sheet with a fluid pressure device.

Figure 3:
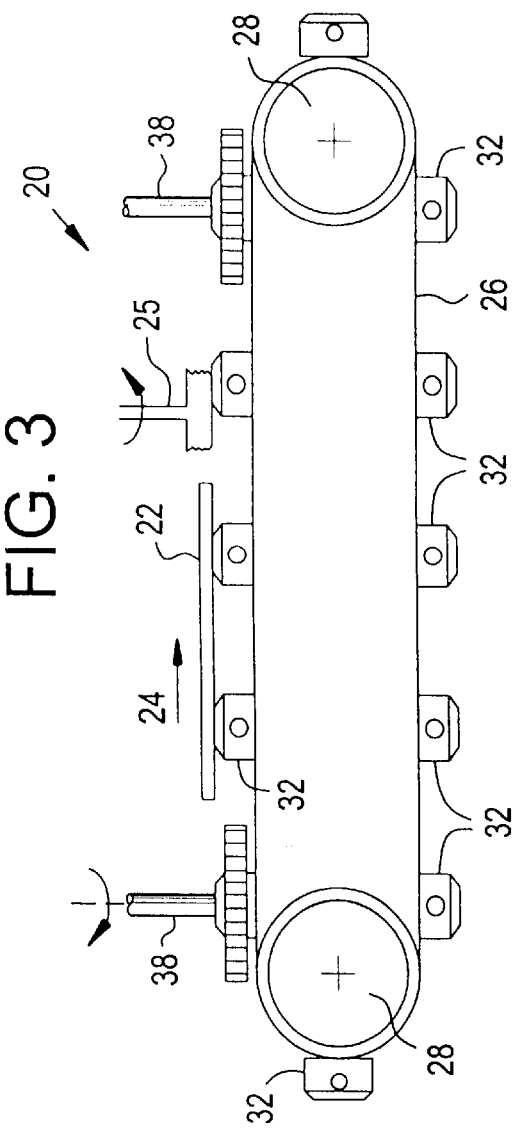
FIG. 3 illustrates a side view of a method and apparatus in accordance with the present invention.

An exemplary embodiment of the present invention is shown in FIG. 3 and is designated generally by reference numeral 20. FIG. 3 illustrates a machine for transporting a glass sheet 22 in the direction of arrow 24, while at least one edge of the glass sheet is being ground or polished by a grinding or polishing device 25, for example a grinding wheel. The apparatus shown in FIG. 3 includes a conveyor, which in an exemplary embodiment include belts 26 held by pulleys 28 which are driven by a motor (not shown).

Figure 4:
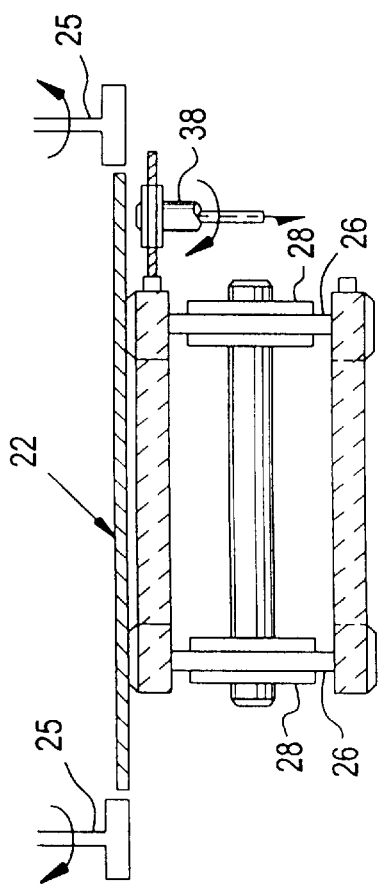
FIG. 4 illustrates an end view of a method and apparatus in accordance with the present invention.

According to the present invention, a fluid pressure device is utilized to hold the glass sheet 22 during grinding or polishing of the glass sheet. As used herein, fluid pressure device means a device that utilizes gas or liquid pressure to exert a force on at least one major surface of the glass sheet to hold the glass in place while the edge of the glass is being finished. In one aspect of the invention shown in FIGS. 3 and 4, the fluid pressure device may utilize subatmospheric (vacuum) pressure to hold the glass in place while it is being finished by grinding or polishing wheels 25. As shown in FIG. 3, such a device can comprise a plurality of elements 32 which are designed to provide a vacuum pressure on surface of the glass sheet facing the belts 26. The elements 32 may comprise a bar of material having opening 34 that can be releasably connected to a coupler 38 that can be connected to a vacuum pump (not shown).

Figure 5:
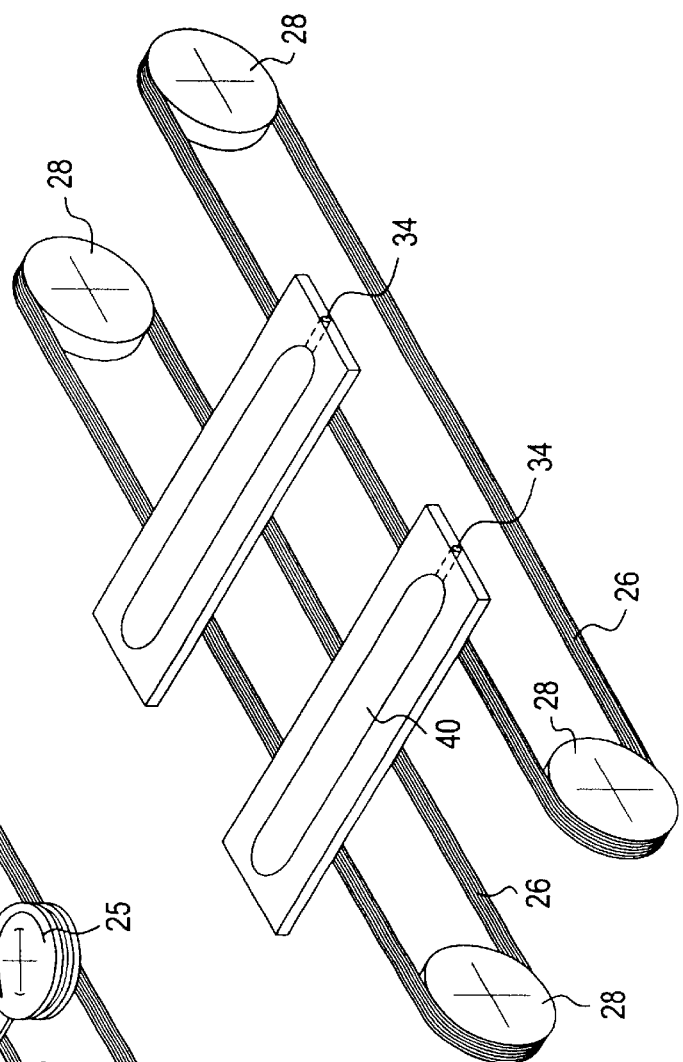
FIG. 5 illustrates a top view of a vacuum bar in accordance with the present invention.

Referring now to FIG. 5, the openings 34 are in fluid communication with at least one vacuum port 40 designed to apply a vacuum pressure to the surface of the glass sheet 22 facing the belt 26. It will be appreciated that a plurality of vacuum ports in fluid communication with the openings 34 may be utilized to apply a vacuum pressure to the surface of the glass sheet. In one aspect of the invention, the coupler 38 may be engaged with the opening 34 of the element 32 to hold the sheet prior to grinding of the sheet edges. After grinding of the sheet edges, the coupler can be disengaged to release the glass sheet so that the sheet can be transported for further processing and packaging.

Figure 6:
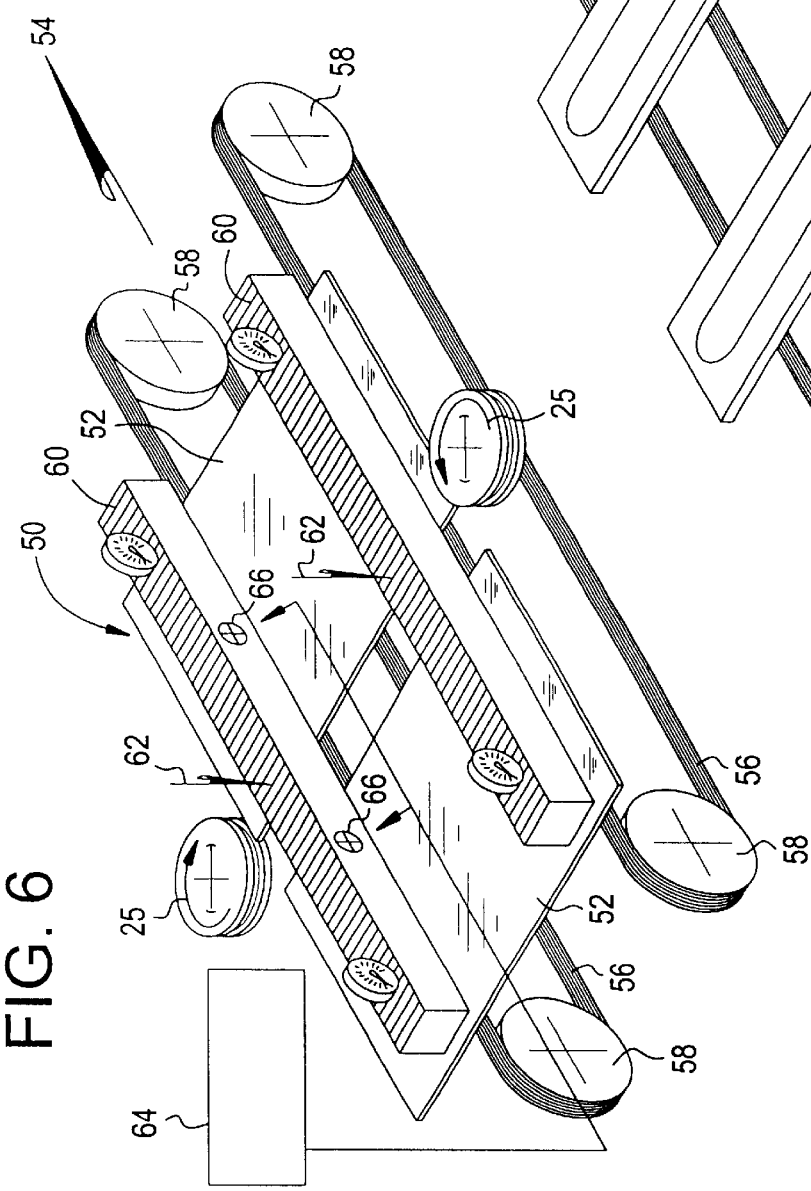
FIG. 6. illustrates a perspective view of a method and apparatus in accordance with the present invention.

Referring now to FIG. 6, in another embodiment of the present invention designated generally as reference numeral 50, a positive fluid pressure is utilized to hold and transport a sheet of material 52, such as a sheet of glass, in the direction of arrow 54. While the sheet is being held and transported in the direction of arrow 54, a grinding or polishing device 25, for example a grinding wheel, grinds or polishes at least one edge of sheet 52. In one aspect of the invention, the grinding or polishing device 25 is an abrasive grinding wheel, for example a diamond grinding wheel rotating at a speed of approximately 2850 revolutions per minute.

The apparatus shown in FIG. 6 also includes a conveyor, which in an exemplary embodiment includes, belts 56 held by pulleys 58 which are driven by a motor (not shown).

According to the present invention, a fluid pressure device is utilized to hold the sheet 52 during grinding or polishing of the sheet 52. In one aspect of the invention, the fluid pressure device shown in FIG. 6 is a hydrostatic bearing 60 which exerts a downward force on the sheet 52 in the direction of arrows 62. Hydrostatic bearings are known, and details of such devices may be found in chapter 9 the book by Alexander Slocum entitled *Precision Machine Design*, Society of Manufacturing Engineers (1992). It will be understood that the fluid pressure device may comprise an aerostatic bearing.

Still referring to FIG. 6, the hydrostatic bearing includes a water supply 64, which supplies water to inlets 66 of bearing 60. It will be understood that the water supply can be contained in any appropriate reservoir for holding the water and a standard pump can be utilized to supply the water to the inlets at the appropriate pressure. It will also be understood that the arrangement shown is FIG. 6 is exemplary only, and a different fluid, such as hydraulic fluid, or a different number of inlets, flow rates and pressures can be utilized to hold the sheet of material.

Figure 7:
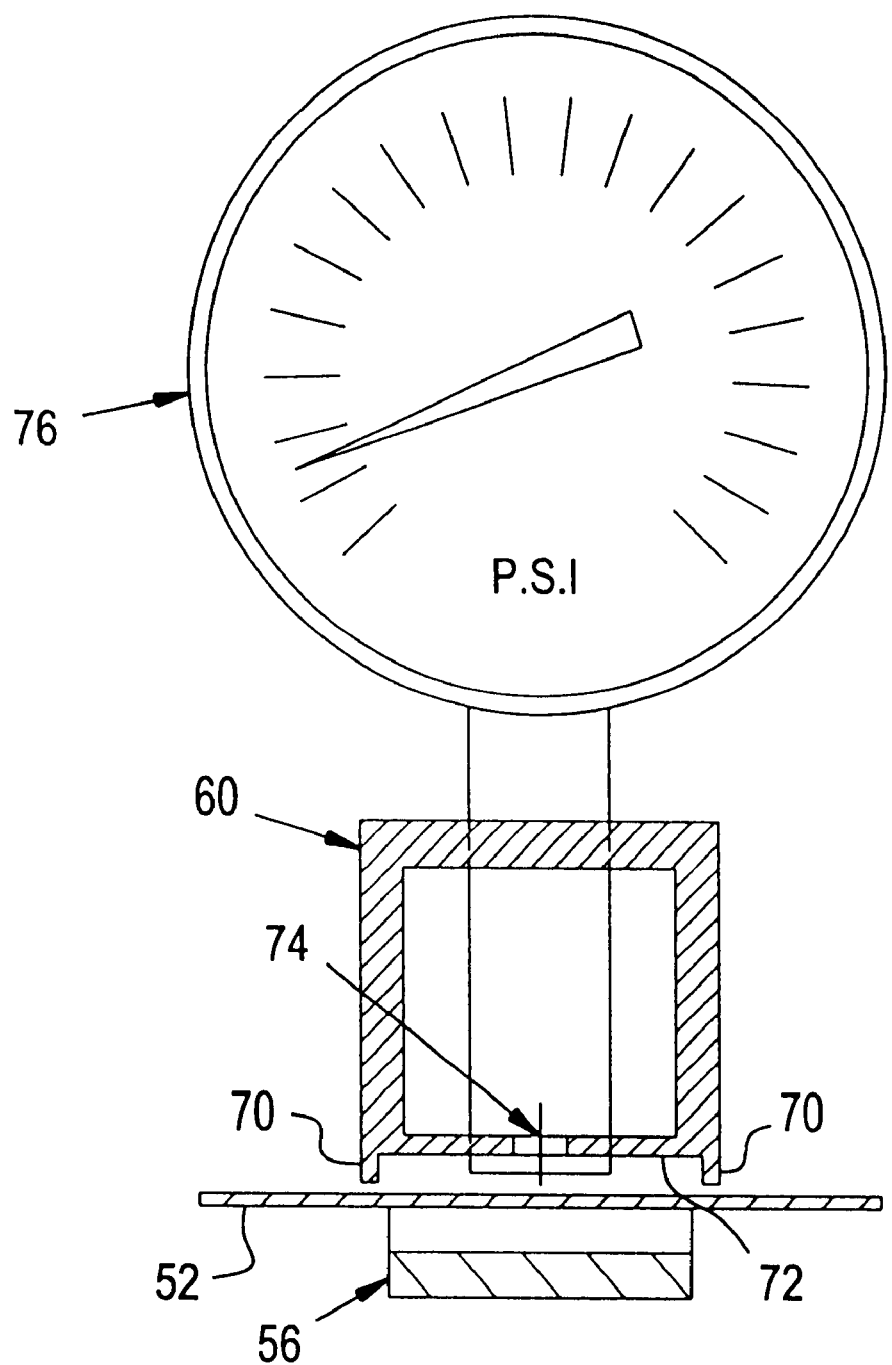
FIG. 7 illustrates a cross-sectional view of a hydrostatic bearing in accordance with the present invention.

Referring now to FIG. 7, which illustrates a cross-sectional view of a hydrostatic bearing in accordance with the present invention the bearing 60 includes skirts 70 which protrude from the bearing 60 and create a pocket 72 on the underside of the bearing 60. The underside of the bearing includes outlets 74 for discharging water onto the surface of the glass sheet 52. Analog pressure gauge 76, in fluid communication with the hydrobar measures the pressure of the water which holds the sheet 52 on the belt 56. The water flowing through the outlets 74 creates a fluid pressure in the pocket 72 which holds the glass sheet in place during grinding of the edges of the sheet.

Experimentation has indicated that a holding force of at least 10 pounds is sufficient to hold a sheet of glass on a conveyor belt having an average coefficient of friction equal to 0.45 while the edges of the sheet are being ground by a diamond wheel rotating at approximately 2850 revolutions per minute. In the experiments, the glass was transported at a rate of about 4.0 to 6.5, preferably about 4.5 to 6.0 meters/minute. By holding force, we mean the force required to displace the sheet of glass from between the belts 56 and the hydrostatic bearings, which can also be referred to as the pullout force. The pullout force can be measured using a spring pullout gauge. Depending on the coefficient of friction of the conveyor belt, the grinding wheel type and the amount of force being applied to the edge of the sheet 52, more or less downward force may be desired.

A holding force greater than 10 pounds was achieved by flowing water into the inlets 66 sized approximately 0.5 inches in diameter at about 30 gallons per minute and 30 pounds per square inch creating a hydrostatic pressure in pocket 72 of between about one and two pounds. The bearing was positioned approximately 0.010 inches from the upper surface of glass sheet 52. A plurality of outlets approximately 0.095 inches in diameter, spaced apart approximately 1.25 inches on center along the length of the hydrobar provided a sufficient holding force. In an exemplary, non-limiting experiment a hydrobar containing 64 outlets along the length of a bar 82.25 inches in length was used successfully to hold a sheet of glass while it was ground on its edges.

It will be apparent to those skilled in the art that various modifications and variations can be made in the practice of the present invention without departing from the spirit or scope of the invention. Thus, it is intended that the present invention cover the modifications and variations of this invention provided they come within the scope of the appended claims and their equivalents.

What is claimed is:

1. A method for grinding or polishing at least one edge of a sheet of material which has a first major surface and a second major surface, said method comprising:

grinding or polishing the at least one edge of the sheet using a grinding or polishing device;

supporting the first major surface on a conveyor; and holding the sheet on the conveyor with a fluid pressure device which is positioned adjacent the second major surface and which produces a positive pressure on said second major surface which results in a frictional force between the first major surface and the conveyor which is sufficient in and of itself to maintain the sheet on the conveyor during the grinding or polishing of the at least one edge of the sheet, wherein the sheet is moved linearly by the conveyor during said grinding or polishing.

2. The method of claim 1, wherein the sheet is a glass sheet for use in a liquid crystal display.

3. The method of claim 2, wherein the fluid pressure device produces a pullout force of at least 10 pounds.

4. The method of claim 1 wherein the fluid pressure device is a liquid pressure device.

5. The method of claim 1 wherein the fluid pressure device produces a pullout force of at least 10 pounds.

6. The method of claim 1 wherein the fluid pressure device is an air pressure device.

7. An apparatus for grinding or polishing at least one edge of a sheet of material which has a first major surface and a second major surface, said apparatus comprising:

a grinding or polishing device for grinding or polishing the at least one edge of the sheet;

a conveyor for supporting the first major surface of the sheet and for moving the sheet linearly during the grinding or polishing; and a fluid pressure device for creating a positive pressure adjacent the second major surface which results in a frictional force between the first major surface and the conveyor which is sufficient in and of itself to hold the sheet on the conveyor during the grinding or polishing.

8. The apparatus of claim 7 wherein the fluid pressure device creates a pullout force of at least 10 pounds.

9. The apparatus of claim 7 wherein the fluid pressure device is a liquid pressure device.

10. The apparatus of claim 9 wherein the liquid pressure device creates a pullout force of at least 10 pounds.

11. The apparatus of claim 7 wherein the fluid pressure device is an air pressure device.

* * * * *